United States Patent [19]

Holzenberger

[11] 4,046,389
[45] Sept. 6, 1977

[54] STUFFING BOX

[75] Inventor: Kurt Holzenberger, Frankenthal, Pfalz, Germany

[73] Assignee: Klein, Schanzlin & Becker Aktiengesellschaft, Frankenthal, Germany

[21] Appl. No.: 703,631

[22] Filed: July 8, 1976

[30] Foreign Application Priority Data

Aug. 2, 1975 Germany .......................... 2534651

[51] Int. Cl.² ............................................. F16J 15/18
[52] U.S. Cl. .................................................. 277/113
[58] Field of Search ............... 277/105, 113, 117, 118, 277/119, 123

[56] References Cited

U.S. PATENT DOCUMENTS

| 2,148,038 | 2/1939 | Raybould | 277/105 |
| 2,441,705 | 5/1948 | Jacobsen | 277/113 |
| 3,652,098 | 3/1972 | Kawazu | 277/105 |

Primary Examiner—Robert I. Smith
Attorney, Agent, or Firm—Peter K. Kontler

[57] ABSTRACT

A gland for compressing packings in the receptacle of a stuffing box has a washer-like stamping made of metallic sheet material and bearing against the exposed side of the outermost packing, and a cupped section whose flange is axially movably secured to the receptacle and whose cylindrical portion is spot welded or riveted to the stamping. The cylindrical portion of the cupped section has reinforcing ribs which extend in parallelism with the shaft or spindle which is engaged by the packing and which may comprise portions extending into the flange substantially radially of the shaft or spindle. The second section is made by deep drawing of corrosion-resistant sheet steel. The inner surfaces of the stamping and second section are out of contact with the shaft or spindle but the periphery of the stamping is in sliding contact with the internal surface of the receptacle.

6 Claims, 2 Drawing Figures

STUFFING BOX

BACKGROUND OF THE INVENTION

The present invention relates to stuffing boxes in general, and more particularly to improvements in glands which serve to compress one or more stuffing box packings in the receptacles of stuffing boxes for rotary and/or reciprocable members, for example, for the shafts of pumps or for the spindles of valves.

The gland of a stuffing box is normally designed to engage the internal surface of the receptacle for the packing or packings and to remain spaced apart from the periphery of the movable member (hereinafter called shaft). Means is provided to move the gland axially so as to effect a compression of the packing or packings in the receptacle whereby the compressed packing or packings bear against the periphery of the shaft and prevent or reduce leakage of a fluid along the shaft. As a rule, the gland of a stuffing box consists of cast iron. Such glands can be mass-produced at a relatively low cost; however, they normally require at least some expensive and time-consuming secondary treatment, normally a mechanical treatment which is needed to insure an accurate fit in the receptacle and the absence of contact with the periphery of the shaft. Another drawback of cast iron glands is that their resistance to corrosion is low, i.e., they are likely to be attacked by the corrosive ingredients of air at the outer side of the stuffing box and by a gaseous or liquid fluid which is to be confined by the packing or packings of the stuffing box. It was already proposed to employ high-quality metallic materials, especially steel; however, this contributes significantly to the initial cost of the stuffing box.

SUMMARY OF THE INVENTION

An object of the invention is to provide a gland for stuffing boxes which is superior to cast iron glands, whose initial cost does not exceed the cost of cast iron glands, and whose resistance to corrosion at least matches that of presently known glands.

Another object of the invention is to provide a stuffing box which embodies the improved gland.

A further object of the invention is to provide a gland which can be mass produced at a low cost, whose resistance to permanent deformation is at least as satisfactory as that of presently known glands, and which can be used as a superior substitute for conventional glands in existing stuffing boxes.

An additional object of the invention is to provide a highly corrosion-resistant gland which can be produced in any desired practical size, whose weight is a fraction of the weight of cast iron glands, and which can be secured to and adjusted relative to the receptacle for one or more packings by resorting to a variety of readily available fastening or coupling means.

The invention is embodied in a gland for use in a stuffing box of the type wherein a receptacle surrounds a portion of a movable member (reciprocable and/or rotary shaft or spindle) and confines at least one annular packing which surrounds the movable member and is urged against the periphery of the movable member as well as against the internal surface of the receptacle by the improved gland which latter is adjustable axially of the movable member to thereby determine the extent of deformation of the packing. The gland comprises an annular first section (preferably a stamping resembling a flat washer and made of corrosion-resistant metallic sheet material) which spacedly surrounds the movable member and abuts against the packing in the internal chamber of the receptacle, and a cupped second section which is adjustably secured to the receptacle and engages the first section opposite the packing (the two sections can be rigidly connected to each other by spot welding and/or by one or more rivets or the like). The second section is preferably produced by deep drawing from a corrosion-resistant metallic sheet material and has reinforcing means (preferably in the form of ribs which extend, at least in part, in parallelism with the axis of the movable member) serving to prevent permanent or excessive elastic deformation of the second section under the action of forces which develop when the first section is biased against the packing by the second section.

The novel features which are considered as characteristic of the invention are set forth in particular in the appended claims. The improved gland itself, however, both as to its construction and the mode of making and using the same, together with additional features and advantages thereof, will be best understood upon perusal of the following detailed description of certain specific embodiments with reference to the accompanying drawing.

DESCRIPTION OF THE PREFERRED EMBODIMENTS

Figure 1:
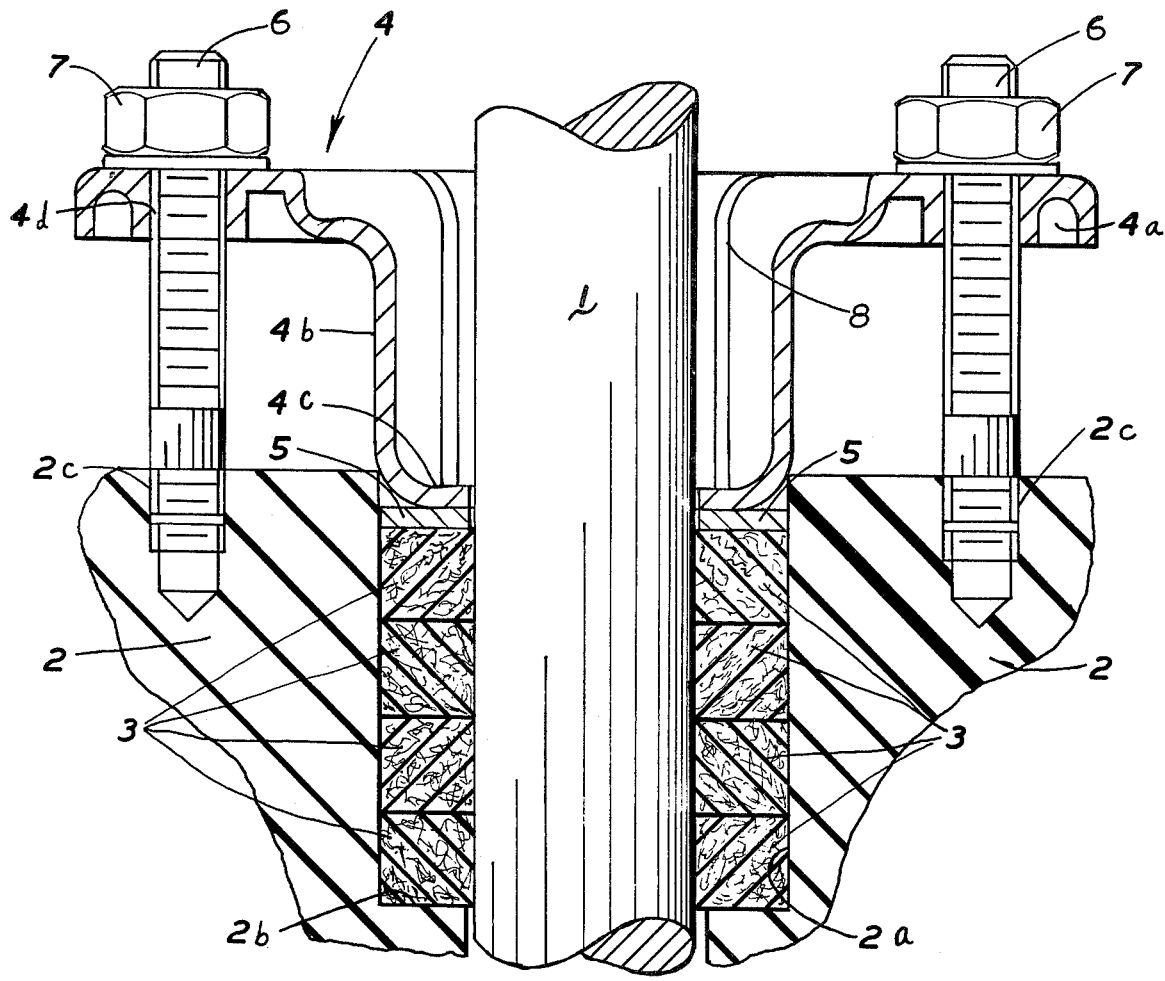
FIG. 1 is an axial sectional view of a stuffing box utilizing a gland which is constructed, assembled and mounted in accordance with one embodiment of the invention.

The stuffing box which is shown in FIG. 1 comprises a receptacle 2 which can form part of the body of a valve or the housing of a pump and defines a cylindrical chamber 2a for a stack of annular stuffing box packings 3. These packings surround the periphery of a rotary and/or reciprocable member 1 (e.g., the spindle of a valve or the shaft of a centrifugal pump) and are biased against each other and against the internal shoulder 2b of the receptacle 2 by a novel gland which includes two sections 4 and 5. The section 4 is a cup-shaped member having an outer portion or flange 4a which extends radially outwardly beyond the chamber 2a and a cylindrical portion 4b whose bottom wall 4c extends radially inwardly toward the periphery of the member 1. The portions 4a and 4b are reinforced by ribs or corrugations 8 which extend in part in parallelism with the axis of the movable member 1 and in part radially of such member. The section 5 of the improved gland is a flat washer-like component which is secured to the outer side of the bottom wall 4c by spot welding (FIG. 1) or by rivets (FIG. 2) and bears against the exposed surface of the outermost packing 3 in the chamber 2a. The means for adjustably securing the flange 4a of the gland to the receptacle 2 comprises at least two discrete fasteners each of which includes an externally threaded stud 6 and a nut 7. The studs 6 extend through openings 4d in the flange 4a and their inner end portions are received in tapped bores 2c of the receptacle 2. The nuts 7 mate with the outer end portions of the respective studs 6 and can be rotated clockwise or anticlockwise to respectively increase or reduce the force with which the section 5 of the gland compresses the packings 3 in the chamber 2a. It is clear that the studs 6 and nuts 7 constitute but one type of means for adjustably securing the gland to the receptacle 2; for example, the parts 6, 7 can be replaced by cap screws or collar screws, or the flange 4a may be provided with an internally threaded cylindrical portion (screwed gland) which mates with an externally threaded extension of the receptacle 2.

The peripheral surface of the section 5 preferably abuts against and is slidable along the internal surface of the receptacle 2; however, the internal surface of the section 5 is spaced apart from the periphery of the movable member 1, the same as the internal surface of the bottom wall 4c.

The section 4 of the gland can be mass-produced by deep drawing or by resorting to an analogous technique. At least this section of the gland preferably consists of a highly corrosion-resistant metallic sheet stock, such as austhenitic alloy steel. The section 5, which serves to guide the gland relative to the receptacle 2 and movable member 1, may be mass-produced by stamping or the like. Neither of the two sections of the improved gland requires any secondary treatment, i.e., the deep-drawing procedure suffices to produce the section 4 with a requisite degree of accuracy, and the stamping technique suffices to produce a satisfactory section 5.

The length, positions and number of reinforcing ribs 8 are selected with a view to insure a highly satisfactory resistance to flexing or bending when the nuts 7 are rotated in a direction to force the section 5 deeper into the chamber 2a. The provision of ribs 8 on the section 4 does not contribute significantly to complexity of the deep drawing operation.

Since the section 5 is secured (preferably spot welded or riveted) to the bottom wall 4c of the section 4b, it insures that the bottom wall 4c does not contact the periphery of the movable member 1 when the gland is axially movably coupled with the receptacle 2. Thus, the section 5 serves as a means for transmitting compressive stresses to the packings 3 as well as for centering the section 4 with respect to the movable member 1 and receptacle 2.

Figure 2:
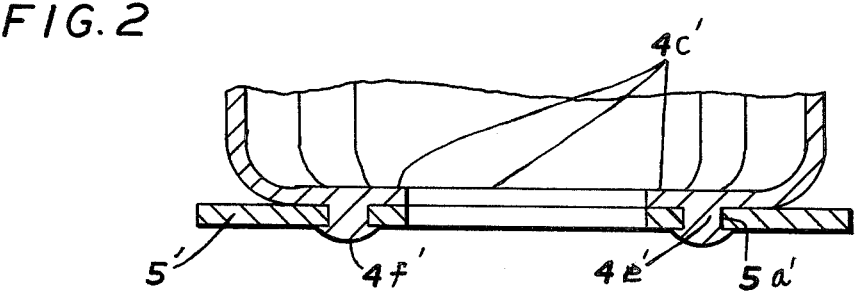
FIG. 2 is a fragmentary sectional view of a modified gland.

It is also within the purview of the invention to provide the section 4 with openings which receive suitable projections of the bottom wall 4c. The projections are deformed at the outer side of the section 5 to establish a permanent rigid connection between the two component parts of the gland. Such connection is an equivalent of a connection which is established by means of conventional rivets. Reference may be had to FIG. 2 which shows that the section 5' has openings 5a' for projections 4e' of the bottom wall 4c'. The free ends of the projections 4e' are deformed to form rivet heads 4f'. The projections 4e' and the rivet heads 4f' may be hollow, i.e., the projections 4e' may constitute outwardly bent portions of sheet material which is used for the making of the section 5'.

The thickness of the section 4 may equal or approximate the thickness of the section 5 or 5'; this renders it possible to make such parts of the same starting material. However, it is equally possible to use a relatively thin sheet metal stock for the making of section 4 and a thicker sheet metal stock for the making of section 5 or 5' (or vice versa). Also, the material of the section 5 or 5' may be different from that of the section 4. Certain surfaces of the section 4, 5 and/or 5' can be coated with films of highly wear- and corrosion-resistant material whose characteristics are selected in dependency on the nature of fluid which is to be confined by the packings 3.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

What is claimed is:

1. In a stuffing box wherein a receptacle surrounds a portion of a movable member and confines at least one packing which surrounds the movable member and is urged against the periphery of such member and against the internal surface of the receptacle by a gland which is adjustable axially of the movable member to thereby select the extent of deformation of the packing, the improvement which consists in that said gland comprises an annular first section comprising a substantially flat washer spacedly surrounding the movable member and abutting against the packing in the receptacle, and a cupped second section consisting of deep drawn metallic sheet material adjustably secured to the receptacle and engaging with the first section opposite the packing, said second section spacedly surrounding the movable member and having reinforcing means consisting of longitudinal ribs which prevents permanent deformation of said second section under the action of forces which develop when said first section is biased against the packing by said second section.

2. In a stuffing box as defined in claim 1, wherein said second section comprises a flange extending radially beyond the packing in the receptacle and a portion extending into the receptacle and engaging with said first section.

3. In a stuffing box as defined in claim 1, wherein said first section has a peripheral surface slidably engaging the internal surface of the receptacle.

4. In a stuffing box as defined in claim 1, wherein said gland further comprises means for rigidly connecting said first section with said second section.

5. In a stuffing box as defined in claim 4, wherein said connecting means comprises at least one weld.

6. In a stuffing box as defined in claim 4, wherein said connecting means comprises at least one rivet.

* * * * *